United States Patent Office 3,298,316
Patented Jan. 17, 1967

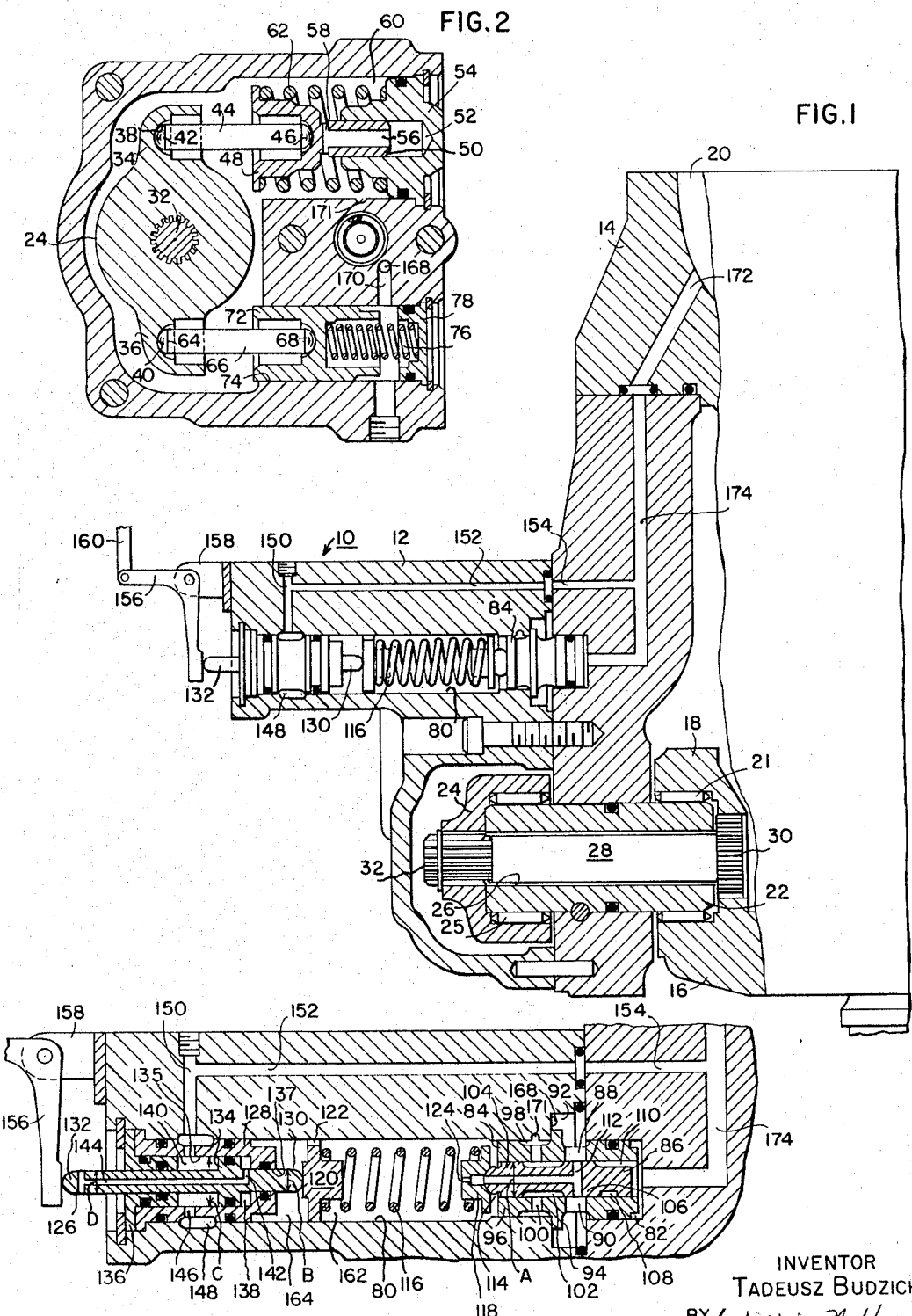

3,298,316
REMOTE ADJUSTMENT FOR PRESSURE
COMPENSATED PUMP SETTING
Tadeusz Budzich, 3344 Colwyn Road,
Cleveland, Ohio 44120
Filed Apr. 6, 1964, Ser. No. 357,460
5 Claims. (Cl. 103—37)

The present invention relates generally to fluid pressure energy translating devices and more particularly to variable displacement pumps and motors, having controls that vary the displacement of the devices to maintain the fluid pressure thereof relatively constant. In even more particular aspects, this invention relates to pressure compensated apparatus for adjusting or controlling the pressure level setting of the controls in a pressure compensated pump.

Automatic controls of the type conventionally used with a variable displacement pump to vary the displacement of the pump to maintain a constant outlet pressure are well known in the art. Generally control systems of this type use a metering spool subjected on one end to the discharge pressure of the pump and with the opposite end engaging a biasing control spring. The discharge pressure acting on the cross-sectional area of the spool acts against the preset bias of the control spring and moves the spool to meter fluid into the displacement changing mechanism of the pump to regulate the output flow thereof. A change in the preload of the control spring will automatically cause a proportional change in the level of the regulated pressure. Modern hydraulic circuits work at very high pressure levels. The manufacturing techniques and the required pump response dictate that the diameter and therefore cross-sectional area of the metering spool be comparatively large. This results in control forces that must be supported by a control spring capable of handling extremely high loads. In some fluid circuits, it essential to vary the control pressure setting of the control system to obtain the best circuit performance. Quite often not only a rapid change in control pressure setting is required but at the same time the required adjustment of the preload on the control spring must be made from a remote location.

Existing control systems usually use the mechanical advantage of a threaded bolt to change the control pressure setting by changing the preload of the control spring. The disadvantage of this method lies in the fact that extensive turning of the threaded bolt is required to change appreciably the control setting, and a wrench or similar device must be used for the purpose. Another disadvantage lies in the fact that the remote operation of such a device requires a complicated and costly mechanism because of the required high torque turning action that must be imparted to the device.

It is therefore a principal object of the present invention to provide an adjusting apparatus that will function with a minimum force input to adjust the pressure level setting of a pressure control system.

Another object of this invention is to provide a control pressure setting adjusting mechanism for use with a pressure control system wherein the adjusting mechanism is hydrostatically balanced with respect to both discharge and control pressure, which permits the adjusting operation to be performed at a minimum force level because the work performed in compressing the control spring is supplied by fluid energy.

Still another object of this invention is to provide a control pressure setting adjusting apparatus for a pressure control system, said adjusting apparatus being adaptable to remote operation.

These and other objects of the invention will be apparent from the following description and drawings in which:

FIGURE 1 is a longitudinal sectional view of a portion of a fluid pump showing the adjusting apparatus of the present invention in association with a fluid pressure control system;

FIGURE 2 is a view taken substantially along lines II—II of FIGURE 1; and

FIGURE 3 is a detailed sectional view of the adjusting apparatus and particular components of the fluid pressure controls on an enlarged scale of FIGURE 1.

The fluid pressure control system as well as the conventional fluid power pump with which it is used, as shown and described herein, is described in detail in application, Serial No. 221,747, filed September 6, 1962. Consequently, for additional showing and description, particularly with regard to the conventional pump, reference may be had thereto.

Referring now to the drawings and for the present to FIGURES 1 and 2 thereof (it should be noted that FIGURE 2 should be viewed relative to FIGURE 1 in a position turned counterclockwise by 90 degrees), a conventional fluid pressure control system 10, hereinafter referred to as the controller, is housed by a control housing 12 that is bolted to a housing 14, which in the well-known manner houses the conventional fluid power pump. A tiltable cam plate 16 is disposed within the housing 14 and a conventional manner provides for the actuation of the pump pistons (not shown) through continuous contact therewith. The cam plate 16 is provided with an annular flange 18 that circumscribes the axis about which the cam plate tilts. When the cam plate displaces the pistons to a discharge position, they discharge fluid at high pressure to high pressure pump port 20 which is shown in FIGURE 1. The flange 18 of the cam plate is journaled by bearings 21 on one end of a cam pin 22 extending from the control housing 12 and through the housing 14. As is well known, by varying the angular displacement of the cam plate 16 the fluid discharge pressure of the pump may be regulated. It is the function of the controller to vary the angular displacement of the cam plate in response to discharge pressure changes to maintain the discharge pressure at a selected level. The means for setting or selecting this level which is described in detail hereinafter conventionally includes a spring adapted for adjustment to vary the preload or compression thereof to in turn establish the control pressure level.

A rocker arm 24 is journaled by bearings 25 to the end of the cam pin 22 contained within the control housing 12; hence, the axis about which the rocker arm rotates coincides with the axis about which the cam plate tilts. A through axis bore 26 is provided in the cam pin 22, within which a torsion shaft 28 is rotatably mounted. This shaft is provided with a splined end 30 that engages the tilttable cam plate 16 at its center of rotation and a splined end 32 that engages the rocker arm 24 at its center of rotation. The rocker arm is provided with two opposed extensions 34 and 36 having part spherical surfaces 38 and 40, respectively. The part spherical surface 38 is engaged by a mating surface 42 of push rod 44. The opposed surface 46 of the push rod 44 engages a spring guide 48 having a cylindrical extension 50 slidably mounted within a cylindrical cavity 52 provided in a spring cover 54. The cavity 52 is connected by passages 56 and 58 to a chamber 60. The spring cover 54 acts as a closure for the chamber 60 and as a mounting for biasing spring 62 extending between the spring cover 54 and the spring guide 48. The spring 62 provides the biasing force for urging the push rod 44 toward the rocker arm 24. The part spherical surface 40 of extension 36 provided on the rocker arm 24 is engaged by a mating surface 64 of a push rod 66. The opposed surface 68 of the push rod 66 engages a control piston 72 slidably mounted within bore 74. A biasing spring 76 is mounted between the control piston 72 and a spring cover 78, which provides a closure for the bore 74. The spring 76 supplies the biasing force for urging the push rod 66 toward the rocker arm 24. The spring 62 is selected so that its biasing force is larger than the combined force of the spring 76 and the force of the moment applied to the cam plate 16 by the pump pistons through the action of conventional return springs used therewith.

The conventional apparatus described hereinabove is actuated by a signal produced by the arrangement now to be described and shown in detail in FIGURE 3.

The control housing 12 is provided with a bore 80 and the housing 14 is provided with a bore 82. A control sleeve 84 is mounted within the bore 82 and a portion of the bore 80. A control spool 86 is slidably mounted within the control sleeve 84. The control sleeve 84 is equipped with ports 88 and 90 that open into a cavity 92, which is an enlarged portion of the bore 80. The control sleeve 84 has lands 94 and 96, which define an annular groove 98 therebetween. The annular groove 98 is connected by drilling 100 to annular groove 102 defined between lands 104 and 106 provided on the control spool 86. The control spool is additionally provided with a groove 108, and a relieved portion 110. A transverse passage 112 extends through the control spool and serves to connect the ports 88 and 90. The passage 112 intersects a longitudinal passage 114 also provided within the control spool 86. A control spring 116 is disposed within the bore 80. This spring is compressed between a spring retainer 118, sealed within the bore 80, and a spring guide 120. The spring guide 120 divides the bore 80 into spaces 162 and 164 connected by a slot 122 provided in the spring guide. The spring retainer 118 engages the control spool 86 and is equipped with a longitudinal passage 124 that connects with the longitudinal passage 114 of the control spool 86. The spring guide 120 may be moved relative to the spring retainer 118 by the action of stepped piston 126 extending through a sleeve 128. The stepped piston 126 is equipped with a front stem 130, an actuation stem 132, and an enlarged section 134. The sleeve 128 located in bore 80 has an internal cylindrical surface 135 slidingly engaging enlarged section 134 of stepped piston 126 and a bore 137 in axial alignment with cylindrical surface 135 slidably engaging front stem 130. The actuation stem 132 of stepped piston 126 is slidably guided and sealed by flange 136. The stepped piston 126 in respect to sleeve 128 and flange 136 defines two annular spaces 138 and 140. The annular space 138 is connected through passages 142 and 144 to atmosphere. The annular space 140 is connected through drillings 146, groove 148, ducts 150, 152, and 154 to the source of high-pressure fluid at the high-pressure port 20 shown in FIGURE 1. The actuation stem 132 of stepped piston 126 works in operational engagement with actuation lever 156 suitably mounted by bracket 158 and connected by link 160 to a control point (not shown).

The shaft 28, as previously described, is connected at one end to the rocker arm 24 and at the other end to the cam plate at its center of rotation. Consequently, any rotation of the rocker arm will cause a corresponding angular displacement of the cam plate and therefore a corresponding variation in the fluid discharge pressure of the pump. Hence, the pressure and volume output of the pump are controlled to provide a constant output pressure level by regulating the angle of the cam plate through rotation of the rocker arm in response to changes in the output pressure from the desired and selected level, as established by the preload setting of the spring 116. With the rocker arm positioned as shown in FIGURE 2, the cam plate will be about half way between zero-output position and maximum-output position.

As hereinbefore described, the push rods 44 and 66 are urged against the opposed extensions 34 and 36, respectively, of the rocker arm by springs 62 and 76, respectively. Since the biasing force of the spring 62 is greater than that of the spring 76 and the force of the moment supplied to the cam plate by the piston return springs, these forces transmitted to the cam plate will cause it to be tilted to the position of maximum output, in the absence of additional force opposing that of the spring 62. However, an opposing force may be selectively applied by means of fluid introduced to the bore 74 through passages 168 and 170. The pressure of the fluid so introduced is made to vary in proportion to any increase in the discharge pressure of the pump above the desired pressure level. This fluid force operates on the control piston 72 to rotate the rocker arm 24 clockwise (as shown in FIGURE 2) to a degree proportional to the increase in fluid pressure above the predetermined level. This rotation of the rocker arm is transmitted to the cam plate 16, which is consequently displaced proportionally to the degree of rocker arm rotation. Therefore, the resulting change in the volume output of the pump is proportional to the degree of rocker arm rotation and consequently the extent of the increase in the discharge pressure level of the pump above the preselected level. The fluid pressure supplied to the bore 74 to provide this action is obtained in the following manner.

The biasing force of control spring 116 acting against the control spool 86 is balanced by the rising discharge pressure in the high-pressure port 20. The high pressure fluid from this port passes through passages 172 and 174 to bore 82 and acts on the cross-sectional area of the control spool 86 to oppose the biasing force of the control spring 116. If the pressure of this fluid exceeds the biasing force of the control spring, the spool will slide to the left (as seen in FIGURE 1). This movement of the spool will connect the relieved portion 110 and the groove 108 of the control spool with the ports 88 and 90. Thus the fluid will pass into the cavity 92 into which these ports open and thence to the bore 74 (as shown in FIGURE 2) through passages 168 and 170. Simultaneously, the high pressure fluid will also flow into transverse passage 112 and longitudinal passage 114 of the control spool, and thence through the longitudinal passage 124 of the spring retainer 118 to the portion of the bore 162 adjacent thereto. The force exerted on the control piston 72 by the high pressure fluid in the bore 74 thereby causes the push rod 66 to rotate the rocker arm clockwise (as shown in FIGURE 2) a distance proportional to the net difference between the sum of this force and that providing the movement to the cam plate by the piston return springs and the biasing force of the spring 62. The rotation of the rocker arm is transmitted through torsion shaft to the tiltable cam plate of the pump by the spline connections 32 and 30. Consequently, the cam plate is displaced by rotational movement of the torsion shaft toward the perpendicular position to an extent proportional to the rotation of the rocker arm and thus the extent to which the output pressure of the pump exceeds the preselected pressure. As previously explained, the displacement of the cam plate in this manner causes the output pressure of the pump to decrease.

The high pressure fluid entering the portion of the bore 162 adjacent to the spring retainer 118 acts in conjunction with the biasing force of the control spring to oppose the force initially moving the control spool. When these opposing forces exceed the force provided by the high pressure fluid in passages 174 and 172, the control spool will move to the right (as viewed in FIGURE 3). The land 106 seals in the right end of the control sleeve isolating relieved portion 110 and the groove 108 from the ports 88 and 90. This consequently stops further passage of the high pressure fluid from passage 174 to the bore 74. In addition, the movement of the control spool connects ports 88 and 90 with the annular groove 98 through annular groove 102 of the control spool. Hence, the high-pressure fluid from the bore 74 is discharged into the chamber 60, which may be regarded as an exhaust zone, through passages 170 and 168, cavity 92, ports 90 and 88, annular grooves 102 and 98, and passage 171. This arrangement also provides for the discharge of the fluid from the bore 80 through longitudinal passages 124 and 114, and transverse passage 112 until the control spool is in equilibrium and is thus returned to the position shown in FIGURE 1.

Bias of the control spring 116 is directly transmitted by spring guide 120 to stepped piston 126. Since the automatic control adjusts the pump displacement to maintain a discharge pressure equivalent to the preload in the control spring 116, the control spool 86 is always maintained in a position of floating equilibrium. Under these conditions, the discharge pressure force developed on the cross-sectional area of the control spool is balanced by the preload in the control spring 116 and the control pressure in space 162. Discharge pressure is fed through ducts 154, 152, 150, groove 148, and drillings 146 to annular space 140. The effective area of enlarged end 134 of stepped piston 126, which is the difference between areas equivalent to diameters C and D is made slightly smaller than area equivalent to diameter A, which is the cross-sectional area of the control spool. All the cross-sectional area equivalent to diameter B of the front stem 130 is made approximately equal to or slightly less than the cross-sectional area A of the control spool.

By this arrangement, both the control spool 86 and stepped piston 126 are maintained in a state of floating equilibrium with the application of a small external force to the stepped piston, in which a balance exists between discharge pressure on one end and spring bias supplemented by the control pressure in space 162 on the other end.

Any additional transmission of force by actuation lever 156 to actuation stem 132 will upset the state of floating equilibrium. The additional force is transmitted through control spring 116 to control spool 86 to move it to the right, as viewed in FIGURE 3, and thereby connect port 90 and cavity 92 with drilling 100 to increase the control pressure level and the volume output of the pump. The increase in the control pressure level will be proportional to the amount of movement of the control spool 86 and hence proportional to the amount of movement of the control lever 160. The control spool 86, when forced right will return to the state of floating equilibrium when it has adjusted the pressure to the new higher selected level and the other spool returns to its normal or neutral position. Conversely, any decrease in the force level applied to stepped piston by actuating the control lever 160 in the opposite direction will reduce the controlled pressure level of the pump. In this way, by application of a small control force to the stepped piston 126, its position in respect to the control spool can be varied to effectively change the controlled pressure level of the pump by changing the preload of control spring 116. This force need only be great enough to overcome the friction loses of the parts, and the whole load of the control pressure spring need not be overcome as in prior art devices.

Although one embodiment of the invention has been shown and described herein, it is obvious that other adaptations and modifications may be made without departing from the scope and spirit of the appended claims.

What is claimed is:

1. In a fluid pressure energy translating device having a pumping mechanism, flow changing means arranged to vary the capacity of said pumping mechanism, means biasing said flow changing means toward a position of maximum flow, fluid actuating means disposed to urge said flow changing means toward a position of minimum flow, pressure responsive control means operationally interconnected with said fluid actuating means to vary the capacity of said flow changing means to maintain a relatively constant control discharge pressure of the device, adjusting means to vary the controlled pressure level of said pressure responsive control means, means to actuate said adjusting means, and pressure balancing means interposed between said adjusting means and said means to actuate said adjusting means for balancing the reaction forces of said adjusting means and isolating said reaction forces from said adjusting means.

2. The combination of claim 1 further characterized by said pressure responsive control means including valve means and control spring means, said control spring means biasing said valve means toward a position of increased flow of the device.

3. In a fluid pressure energy translating device having a pumping mechanism, flow changing means arranged to vary the capacity of said pumping mechanism, spring means biasing said flow changing means toward a position of maximum flow, fluid actuating means disposed to urge said flow changing means toward a position of minimum flow, pressure responsive control means operationally interconnected with said fluid actuating means to vary the capacity of said flow changing means to maintain a relatively constant controlled discharge pressure of the device, said control means including valve means and control spring means, said control spring means biasing said valve means toward a position equivalent to increased flow of the device, and pressure balanced adjusting means including fluid operated force balancing means to vary the controlled pressure level, said force balancing means including a stepped piston and cylinder bore combination, said stepped piston having balancing surface means, duct means to conduct pressure fluid to said balancing surface means, said stepped piston being maintained in a state of floating equilibrium in respect to said cylinder bore while supporting the biasing force of said control spring, and connecting means to functionally interconnect said force balancing means and said control spring means, whereby preload in said control spring means can be regulated by movement of said force balancing means.

4. The combination of claim 3 further characterized by said valve means including a spool biased by said control spring means, the cross-sectional area of the effective balancing surface means being not greater than the cross-sectional area of said spool.

5. In a fluid pressure energy translating device having a pumping mechanism, flow changing means arranged to vary the capacity of said pumping mechanism, spring means biasing said flow changing means toward a position of maximum flow, fluid actuating means adapted to urge said flow changing means toward a position of minimum flow, pressure responsive control means operationally interconnected with said fluid actuating means to vary the capacity of said flow changing means to maintain a relatively constant controlled discharge pressure of the device, said control means including valve means having a spool biased by control spring means, said control spring means biasing said spool toward a position equivalent to increased flow of the device, and pressure balanced adjusting means including fluid operated force balancing means to vary the controlled pressure level, said force balancing means including a stepped piston having balancing surface means the cross-sectional area thereof being less than the cross-sectional area of said spool, and connecting means to functionally interconnect said force balancing means and said control spring means, whereby movement of said stepped piston at low force level will adjust the controlled pressure level of said pressure responsive control means.

References Cited by the Examiner

UNITED STATES PATENTS 2,379,692  7/1945  Dodson _____ 91—434
3,179,061  4/1965  Budzich _____ 103—173

FOREIGN PATENTS 569,658  6/1945  Great Britain.

LAURENCE V. EFNER, *Primary Examiner.*